(12) United States Patent
Hirabayashi (10) Patent No.: US 11,518,032 B2
(45) Date of Patent: Dec. 6, 2022

(54) CONTROL DEVICE AND ROBOT SYSTEM

(71) Applicant: Seiko Epson Corporation, Tokyo (JP)

(72) Inventor: Hiroto Hirabayashi, Matsumoto (JP)

(73) Assignee: SEIKO EPSON CORPORATION

( * ) Notice: Subject to any disclaimer, the term of this patent is extended or adjusted under 35 U.S.C. 154(b) by 232 days.

(21) Appl. No.: 16/813,817

(22) Filed: Mar. 10, 2020

(65) Prior Publication Data

US 2020/0290204 A1 Sep. 17, 2020

(30) Foreign Application Priority Data

Mar. 11, 2019 (JP) .............................. JP2019-043429

(51) Int. Cl.
| | |
|---|---|
| *B25J 9/16* | (2006.01) |
| *G05B 19/4069* | (2006.01) |
| *B25J 9/00* | (2006.01) |
| *B25J 13/08* | (2006.01) |
| *G05B 19/425* | (2006.01) |

(52) U.S. Cl.
CPC ........... *B25J 9/1671* (2013.01); *B25J 9/0081* (2013.01); *B25J 13/089* (2013.01); *G05B 19/4069* (2013.01); *G05B 19/425* (2013.01); *G05B 2219/40392* (2013.01)

(58) Field of Classification Search
CPC ...... B25J 9/1671; B25J 9/1605; B25J 9/1664; B25J 13/089; B25J 9/1602; B25J 9/0081; G05B 19/4069; G05B 19/4068; G05B 19/425; G05B 2219/40121; G05B 2219/40392; G05B 2219/36074; G05B 2219/36143; G05B 2219/40385; A61B 34/10; A61B 34/35
See application file for complete search history.

(56) References Cited

U.S. PATENT DOCUMENTS

| | | | | |
|---|---|---|---|---|
| 5,841,959 | A | * 11/1998 | Guiremand | ........ G05B 19/0426 345/440 |
| 5,937,143 | A | * 8/1999 | Watanabe | ............... B25J 9/1671 700/264 |
| 6,167,328 | A | * 12/2000 | Takaoka | ................. B25J 9/1671 700/250 |
| 2011/0054685 | A1 | * 3/2011 | Wada | ..................... B25J 9/1664 700/252 |

(Continued)

FOREIGN PATENT DOCUMENTS

| | | |
|---|---|---|
| JP | 2007-242054 A | 9/2007 |
| JP | 2009-190113 A | 8/2009 |

(Continued)

*Primary Examiner* — Khoi H Tran
*Assistant Examiner* — Tanner L Cullen
(74) *Attorney, Agent, or Firm* — Harness, Dickey & Pierce, P.L.C.

(57) ABSTRACT

A control device includes: a storage unit storing a work program of a robot; a display control unit displaying a virtual robot formed by virtualizing the robot and a teaching point in a simulator screen at a display unit, based on the work program stored in the storage unit; and an accepting unit accepting a selection of the teaching point displayed in the simulator screen. The display control unit displays, in the simulator screen, a first window including a first command corresponding to the selected teaching point, when the accepting unit accepts the selection of the teaching point.

8 Claims, 11 Drawing Sheets

(56) References Cited

U.S. PATENT DOCUMENTS

| | | | |
|---|---|---|---|
| 2012/0136481 A1* | 5/2012 | Maisonnier | B25J 9/1671 |
| | | | 700/257 |
| 2014/0236565 A1* | 8/2014 | Kuwahara | B25J 9/1671 |
| | | | 703/22 |
| 2017/0087717 A1 | 3/2017 | Hirayama et al. | |
| 2017/0246745 A1* | 8/2017 | Kobayashi | B25J 13/085 |
| 2018/0236657 A1 | 8/2018 | Kuwahara et al. | |
| 2019/0329405 A1* | 10/2019 | Atohira | G06F 3/04883 |
| 2020/0122331 A1* | 4/2020 | Jules | B25J 9/1682 |
| 2021/0339385 A1* | 11/2021 | Sugaya | B25J 9/1671 |

FOREIGN PATENT DOCUMENTS

| | | |
|---|---|---|
| JP | 2018-134703 A | 8/2018 |
| WO | WO-2016-021130 A1 | 2/2016 |

* cited by examiner

CONTROL DEVICE AND ROBOT SYSTEM

The present application is based on, and claims priority from JP Application Ser. No. 2019-043429, filed Mar. 11, 2019, the disclosure of which is hereby incorporated by reference herein in its entirety.

BACKGROUND

1. Technical Field

The present disclosure relates to a control device of a robot, and a robot system.

2. Related Art

WO2016/021130A1 describes a teaching device displaying a model of a robot and a workpiece at a model display unit. WO2016/021130A1 also describes that a command corresponding to a teaching point is displayed near the teaching point.

However, the related art does not disclose a method for intuitively displaying a command corresponding to one arbitrary teaching point, of a large number of teaching points.

SUMMARY

According to an aspect of the disclosure, a control device controlling a robot is provided. The control device includes: a storage unit storing a work program of the robot; a display control unit displaying a virtual robot formed by virtualizing the robot and a teaching point in a simulator screen at a display unit, based on the work program stored in the storage unit; and an accepting unit accepting a selection of the teaching point displayed in the simulator screen. The display control unit displays, in the simulator screen, a first window including a first command corresponding to the teaching point that is selected, when the accepting unit accepts the selection of the teaching point.

DESCRIPTION OF EXEMPLARY EMBODIMENTS

A. First Embodiment

Figure 1:
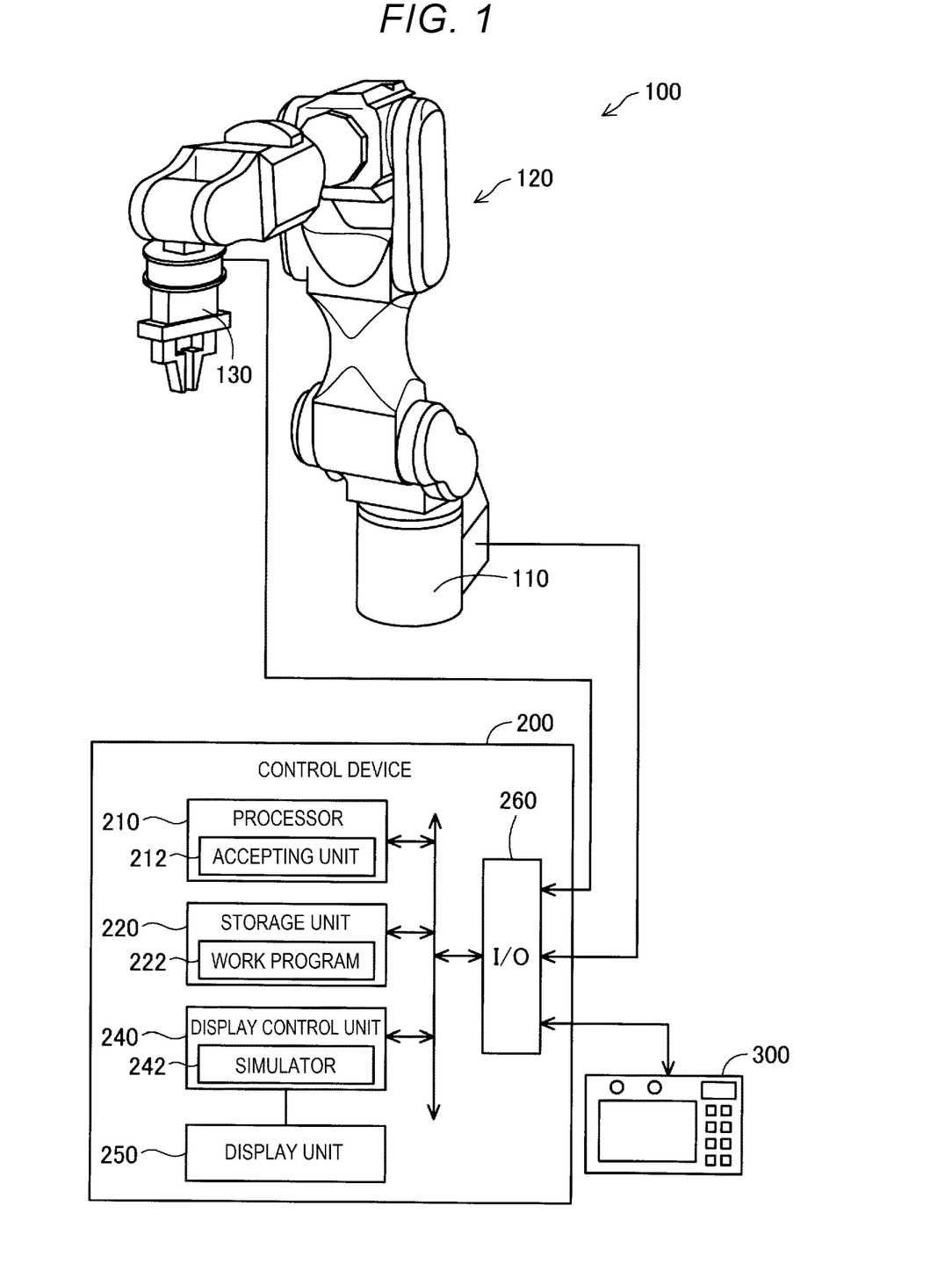
FIG. 1 is an explanatory view of a configuration example of a robot system.

FIG. 1 is a perspective view showing an example of a robot system. This robot system has a robot 100, a control device 200, and a teaching device 300. The control device 200 is communicatively coupled to the robot 100 and the teaching device 300 via a cable or wirelessly.

The robot 100 has a base 110 and an arm 120. A hand as an end effector 130 is installed at the distal end of the arm 120. However, the end effector 130 can be omitted.

The control device 200 has a processor 210, a storage unit 220, a display control unit 240, a display unit 250, and an I/O interface 260. These units are coupled to each other via a bus. The processor 210 is, for example, a microprocessor or processor circuit. The processor 210 has the function of an accepting unit 212, described later. The storage unit 220 stores a work program 222 of the robot 100. The storage unit 220 is also called a memory. The work program 222 is prepared in advance, using the teaching device 300 and a personal computer. The display control unit 240 has the function of a simulator 242. The simulator 242 has the function of displaying a simulator screen at the display unit 250 and displaying a virtual robot formed by virtualizing the robot 100 and a teaching point in the simulator screen, based on the work program 222. The display content of the simulator screen will be described later. The function of the display control unit 240 may be implemented by the processor 210.

As the configuration of the control device 200, various other configurations than the configuration shown in FIG. 1 can be employed. For example, the processor 210 and the storage unit 220 may be removed from the control device 200 in FIG. 1 and may be provided in another device communicatively coupled to the control device 200. In this case, the entirety of this another device and the control device 200 combined together functions as the control device of the robot 100. In another embodiment, the control device 200 may have two or more processors 210. In still another embodiment, the control device 200 may be implemented by a plurality of devices communicatively coupled to each other. In these various embodiments, the control device 200 is configured as a device or device group having one or more processors 210.

Figure 2:
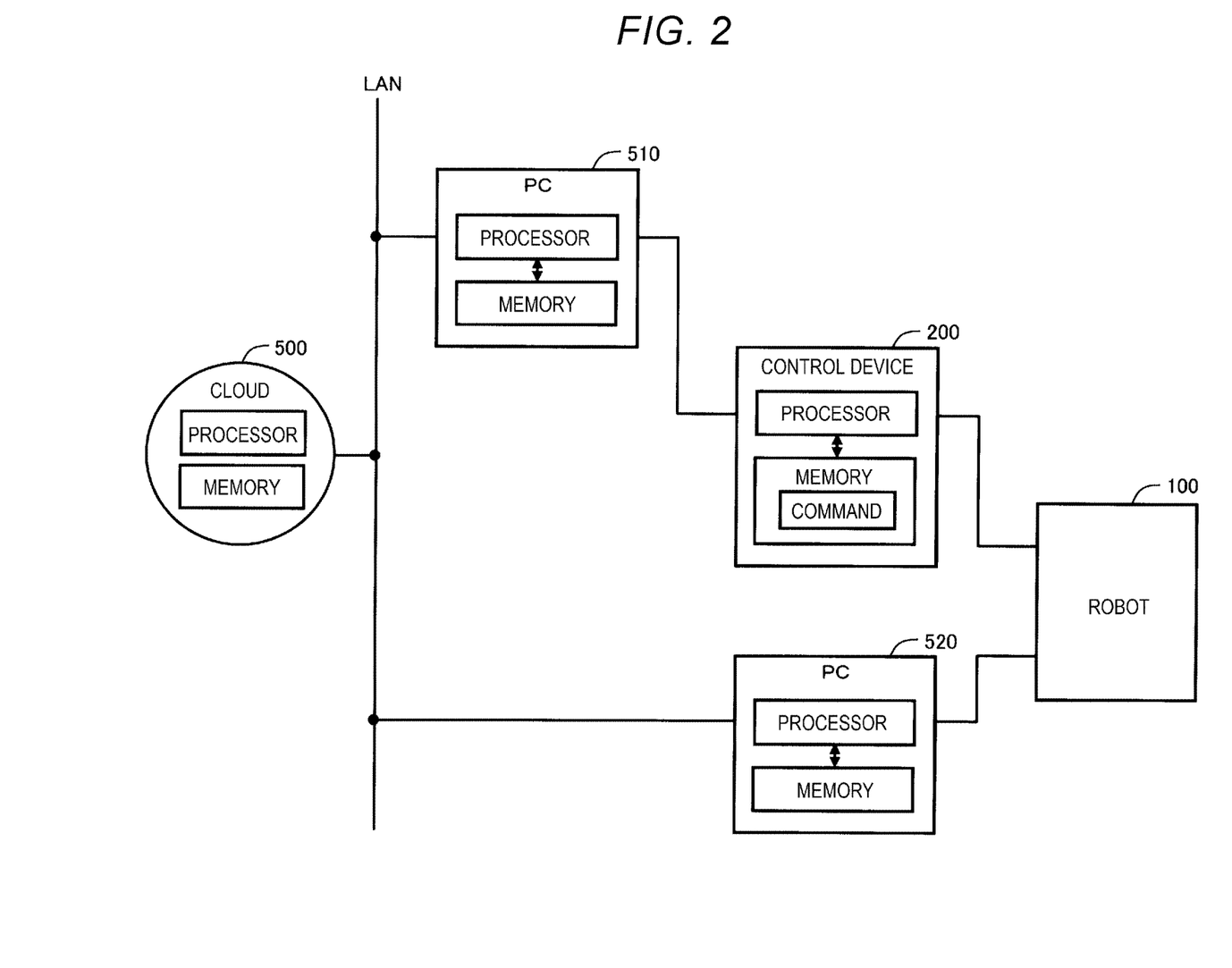
FIG. 2 is a conceptual view showing an example of a control device having a plurality of processors.

FIG. 2 is a conceptual view showing an example where the control device of the robot is formed by a plurality of processors. In this example, personal computers 510, 520 and a cloud service 500 provided via a network environment such as a LAN are illustrated in addition to the robot 100 and he control device 200. Each of the personal computers 510, 520 includes a processor and a memory. Also, the cloud service 500 may use a processor and a memory. The control device of the robot 100 can be implemented, using a part or all of the plurality of processors.

Figure 3:
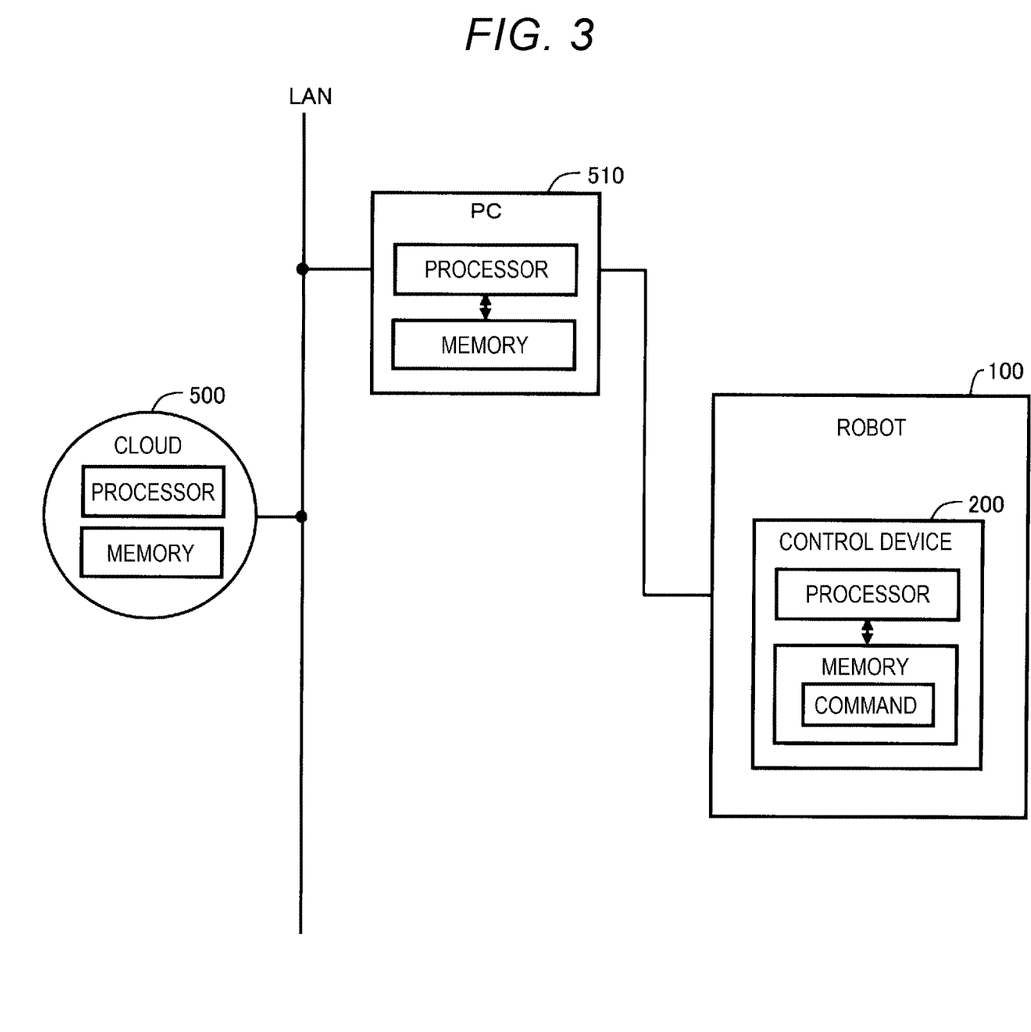
FIG. 3 is a conceptual view showing another example of a control device having a plurality of processors.

FIG. 3 is a conceptual view showing another example where the control deice of the robot is formed by a plurality of processors. This example is different from FIG. 2 in that the control device 200 of the robot 100 is stored in the robot 100. In this example, too, the control device of the robot 100 can be implemented, using a part or all of the plurality of processors.

Figure 4:
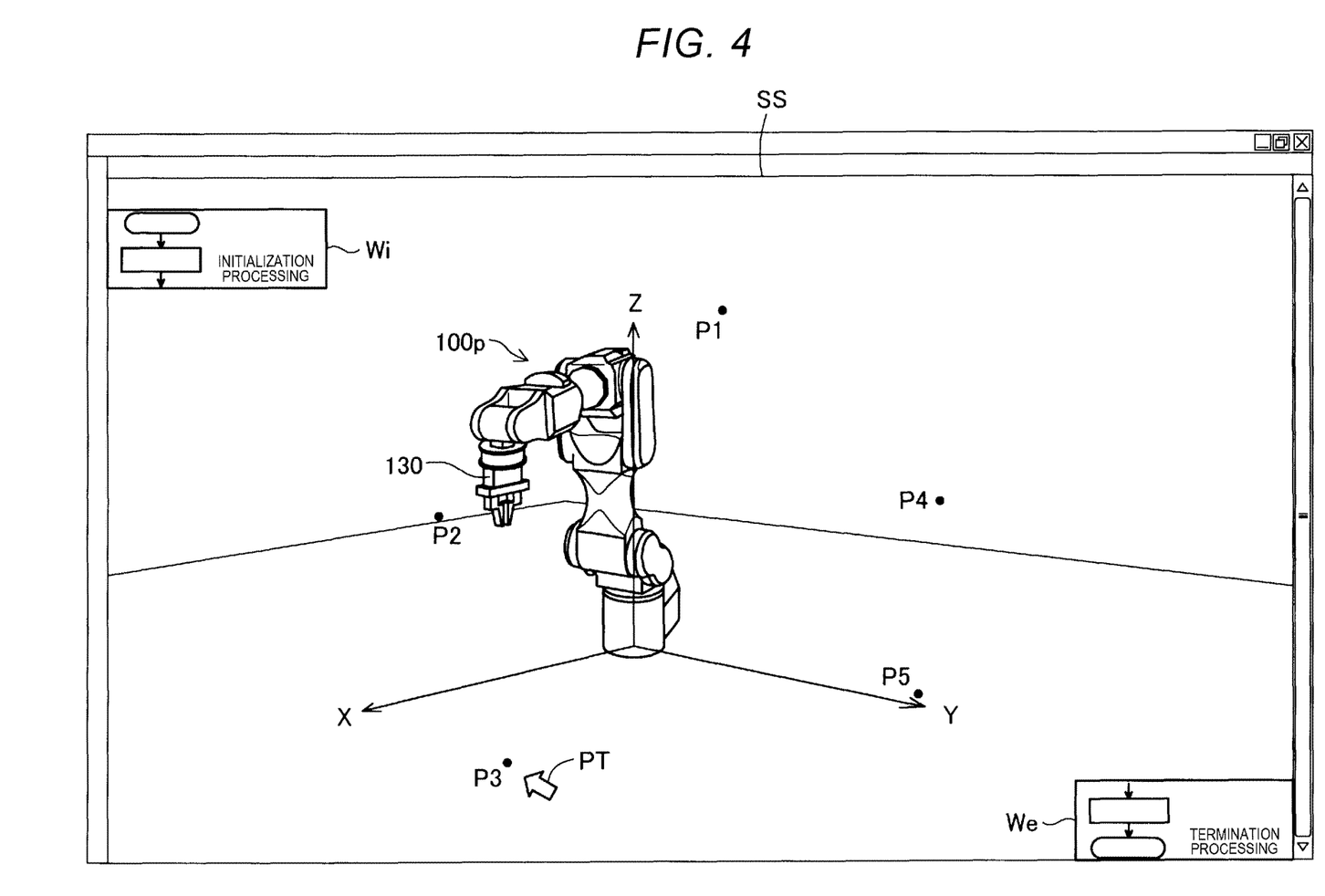
FIG. 4 is an explanatory view showing a simulator screen of a robot.

FIG. 4 is an explanatory view showing an example of a simulator screen SS of the robot 100 displayed at the display unit 250 when the display control unit 240 functions as the simulator 242. The simulator screen SS is a window three-dimensionally and graphically displaying a virtual robot 100p formed by virtualizing the robot 100 in FIG. 1 and a plurality of teaching points P1 to P5, based on the work program 222. The virtual robot 100p is a three-dimensional image of a robot designated as a robot used for work in the work program 222. As the virtual robot 100p, a robot main body without having the end effector 130 installed may be illustrated. The teaching points P1 to P5 are teaching points included in the work program 222.

The simulator screen SS also includes three coordinates axes X, Y, Z of a reference coordinate system of the virtual robot 100p, a pointer PT, an initial window Wi, and an end window We. The pointer PT is operated by a user of the simulator 242, using an operation unit, not illustrated, of the control device 200. The user is also called a "teacher". In the description below, it is assumed that a mouse is used as the operation unit. The initial window Wi shows an outline of initialization processing described at the beginning of the work program 222. The end window We shows an outline of termination processing described at the end of the work program 222. However, these windows Wi, We can be omitted. Preferably, the point of view in the three-dimensional display of the simulator screen SS can be arbitrarily changed by the user performing an operation, using the operation unit such as a mouse. Thus, the state of the virtual robot 100p observed from an arbitrary point of view can be displayed in the simulator screen SS.

When the user selects an arbitrary teaching point from among the plurality of teaching points P1 to P5 in the simulator screen SS in FIG. 4, the accepting unit 212 accepts the selection of the teaching point. The selection of a teaching point is carried out, for example, by a click on the mouse. As the selection is accepted by the accepting unit 212, the display control unit 240 displays a window including a command corresponding to the selected teaching point, in the simulator screen SS.

Figure 5:
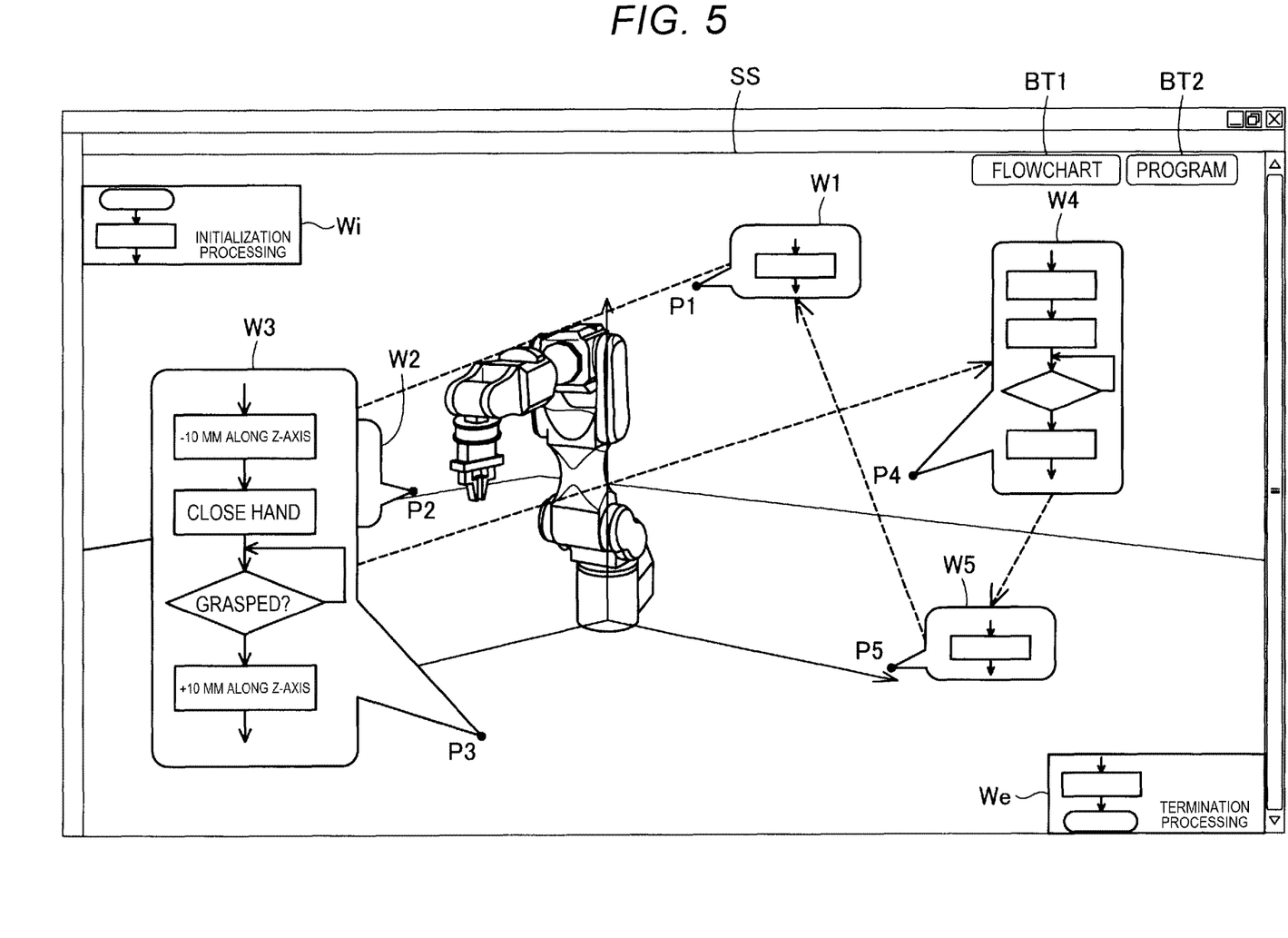
FIG. 5 is an explanatory view showing a display example in a flowchart format when one teaching point in FIG. 4 is selected in a first embodiment.

FIG. 5 is an explanatory view showing an example of the display content displayed in response to the selection of the teaching point P3 in FIG. 4. As the teaching point P3 in FIG. 4 is clicked on and thus selected, a command operating near the teaching point P3 is displayed in the form of a speech balloon from the teaching point P3, as a window W3. When the command is too long to fit within the window W3, a scroll bar may be displayed to enable the window W3 to be scrolled.

At the top right of the simulator screen SS, two buttons BT1, BT2 are displayed as buttons to designate a method for displaying the command within the window W3. The first button BT1 is a button to designate displaying the command in each window in a flowchart format. The second button BT2 is a button to designate displaying the command in each window in a program language format. The user can easily switch the display between the flowchart format and the program language format, using the two buttons BT1, BT2.

In the example in FIG. 5, the command operating near the teaching point P3 is displayed in the flowchart format in the window W3. Specifically, in the window W3, four commands, that is, a command to move −10 mm along the Z-axis, a command to close the hand as the end effector 130, a command to determine whether the hand has grasped a workpiece or not, and a command to move +10 mm along the Z-axis after grasping the work piece, are displayed in the form of a simple flowchart. The user can arbitrarily edit a command of the work program 222 in this window W3. In the command editing, various changes in the content can be made, such as addition or deletion of a command block, or change of a parameter.

The window W3 is equivalent to the "first window" according to the disclosure. The commands in the window W3 are equivalent to the "first command" and the "second command". For example, when the command "Grasped?", which is the third command in the window W3, is defined as the "first command", the command "Close hand" before the command "Grasped?", and the command "+10 mm along Z-axis" after the command "Grasped?" are equivalent to the "second command". The first window may be configured to include at least one of the command before the first command and the command after the first command, as the second command. In this configuration, the operation content before and/or after the first command can be easily understood from the commands included in the first window.

The "command operating near a teaching point" means a group of commands representing operations within a predetermined small movement range around the teaching point. For example, commands operating within a range of a distance equal to or shorter than 10% of a maximum arm length of the robot 100 around the teaching point can be grouped as the "command operating near the teaching point". However, a command which operates once outside the movement range and then returns into the movement range may be regarded as a different group. Such grouping of commands takes the following circumstances into consideration. That is, the operation of the robot 100 is often a certain series of operations near a certain teaching point. At this time, depending on the status of the workpiece or the like, the position of the arm may be finely corrected to continue the work. In this case, a series of operations arranged as a flow is easier for the user to understand. Therefore, grouping commands operating near a teaching point as one group enables the user to understand the operations of the robot 100 more easily.

In the example in FIG. 5, windows W1, W2, W4, W5 corresponding to the other teaching points P1, P2, P4, P5 are displayed in the form of a speech balloon, in addition to the window W3 corresponding to the teaching point P3. Preferably, the content of the other windows W1, W2, W4, W5 than the window W3 corresponding to the teaching point P3 selected in FIG. 4 is more simplified than the window W3. For example, in FIG. 5, the content of the other windows W1, W2, W4, W5 is only the frames of blocks in the flowchart and does not include any command content. Thus, the content of the command operating near the teaching point P3 as the editing target is displayed more in detail than the other teaching points. Therefore, the command of the editing target can be easily grasped and the editing is easy. However, the other windows W1, W2, W4, W5 than the window W3 may be omitted.

Figure 6:
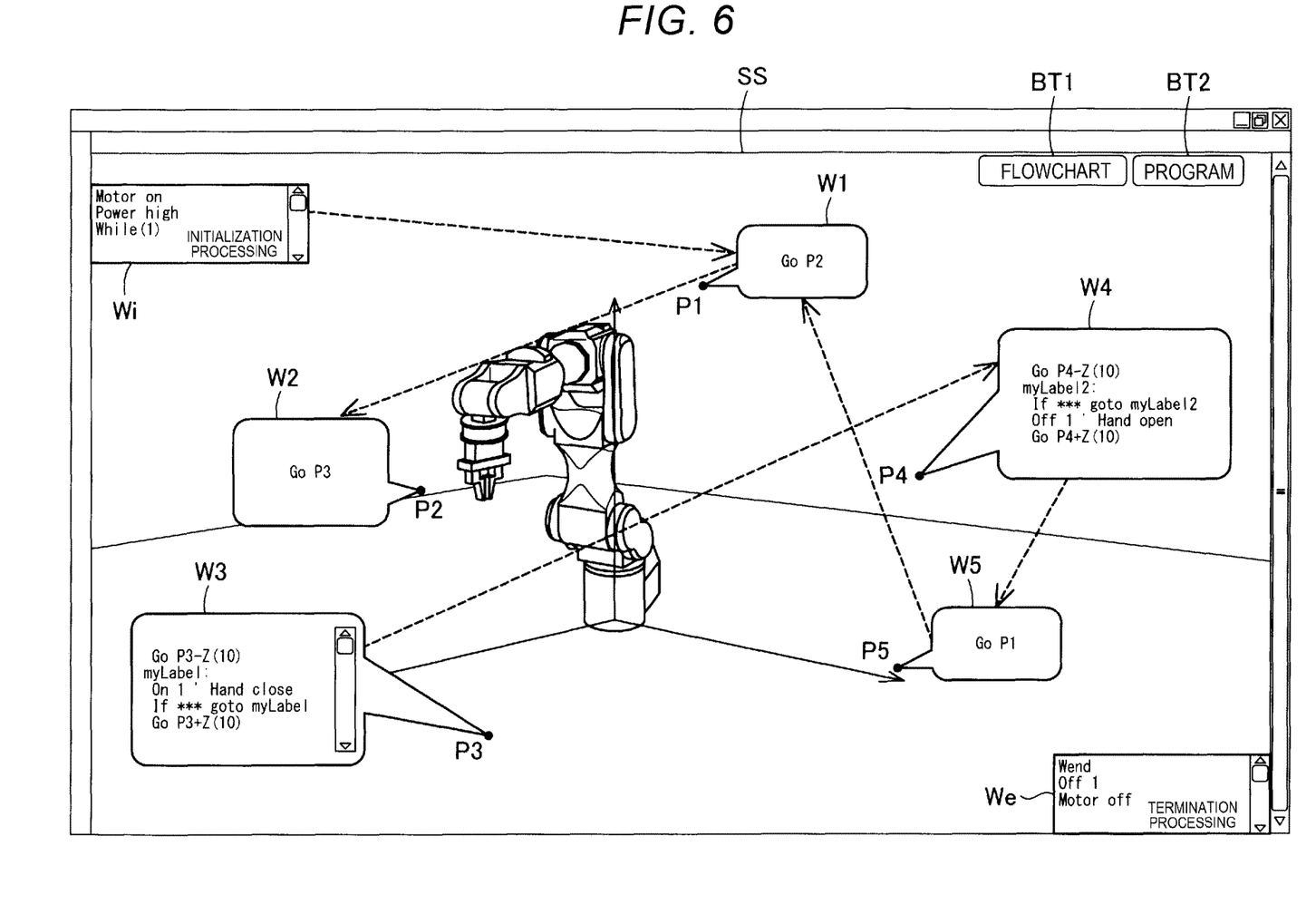
FIG. 6 is an explanatory view showing a display example in a program language format when one teaching point in FIG. 4 is selected in the first embodiment.

FIG. 6 shows the state where the command in each window is displayed in the program language format after the second button BT2 is pressed from the state in FIG. 5. The program language format is also called a source program format. As the display format of the command in the window W3, other formats than the flowchart format and the program language format may be able to be selected. When the simulator screen SS is thus configured to enable selection of a plurality of different display formats as display formats of the command in the window W3, it is advantageous in that the user can arbitrarily select a display format that is easy to use according to the user's preference. As the display format of the command displayed in the window when one teaching point is selected in FIG. 4, one arbitrary display format can be selected in advance from among a plurality of display formats.

Figure 7:
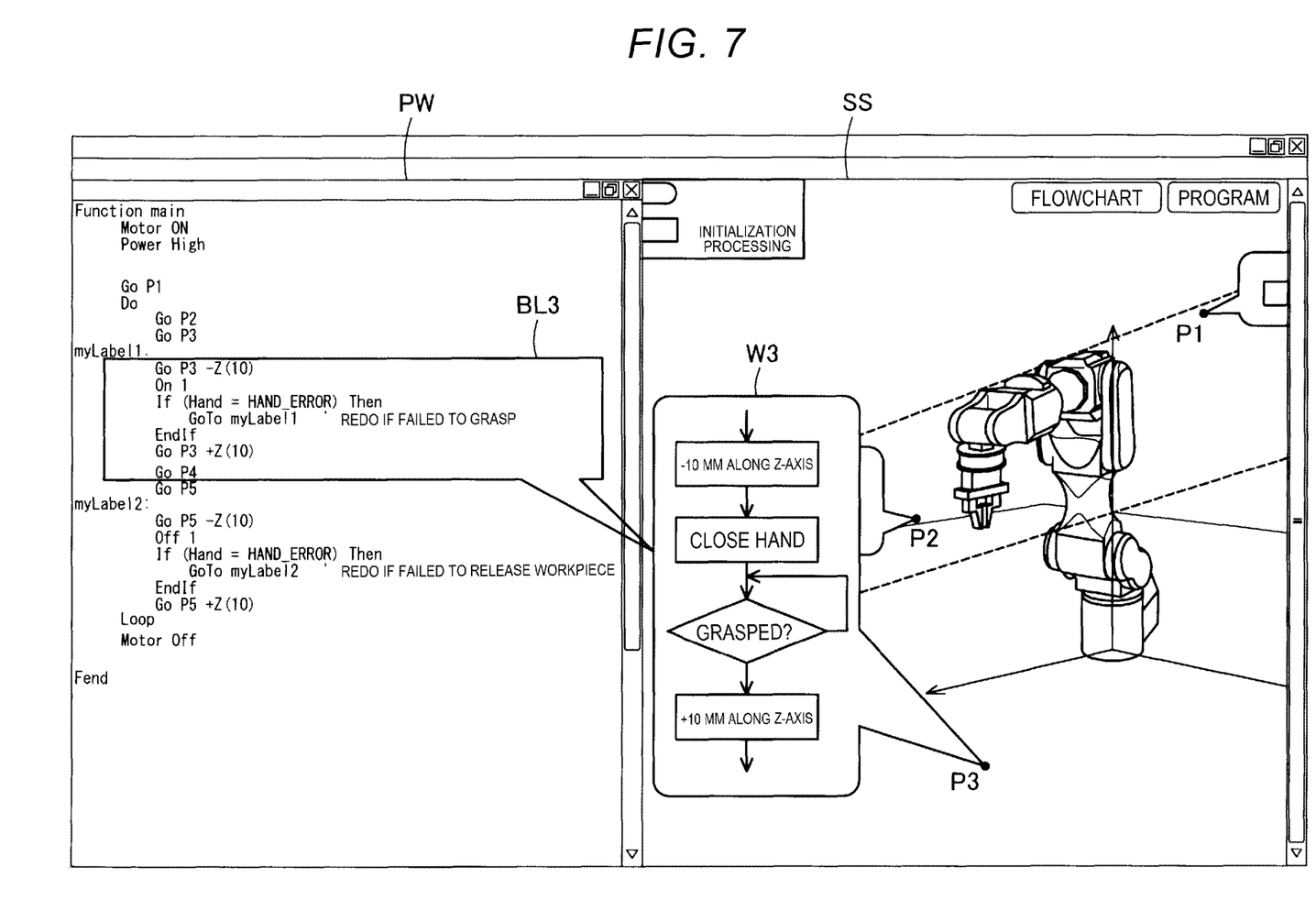
FIG. 7 is an explanatory view showing a display example when one window in FIG. 5 is selected.

FIG. 7 is an explanatory view showing an example of the content displayed when the user selects the window W3 in FIG. 5. As the user selects the window W3 in the simulator screen SS in FIG. 5, the accepting unit 212 accepts the selection. The selection of the window W3 is carried out, for example, a double-click on the mouse. As this selection is accepted by the accepting unit 212, the display control unit 240 displays an editing window PW of the work program 222 and also changes the display form of a command included in the window W3, in the editing window PW. In the example in FIG. 7, highlighting by a speech balloon BL3 is made as the change in the display form. The editing window PW may be displayed from the state in FIG. 4 or FIG. 5.

The editing window PW is a window displaying a source code of the work program 222. In the editing window PW, a source code part describing the command included the selected window W3 is highlighted in contrast to the other parts by the speech balloon PL3. That is, when the accepting unit 212 accepts the selection of the window W3, the display control unit 240 changes the display form of the command in the window W3 in the editing window PW of the work program 222. Consequently, the user can easily recognize the command part of the selected window W3 and can easily edit its source code. As the method for changing the display form of the command, an arbitrary method other than highlighting by a speech balloon can be employed. For example, as the method for changing the display form of the command, highlighting by changing the letter color, highlighting by processing to blot out a range including the command with a specific color, highlighting by an underline, or the like, may be employed. The changing of the letter color and the processing to blot out a range including the command with a specific color are equivalent to "changing the color".

Figure 8:
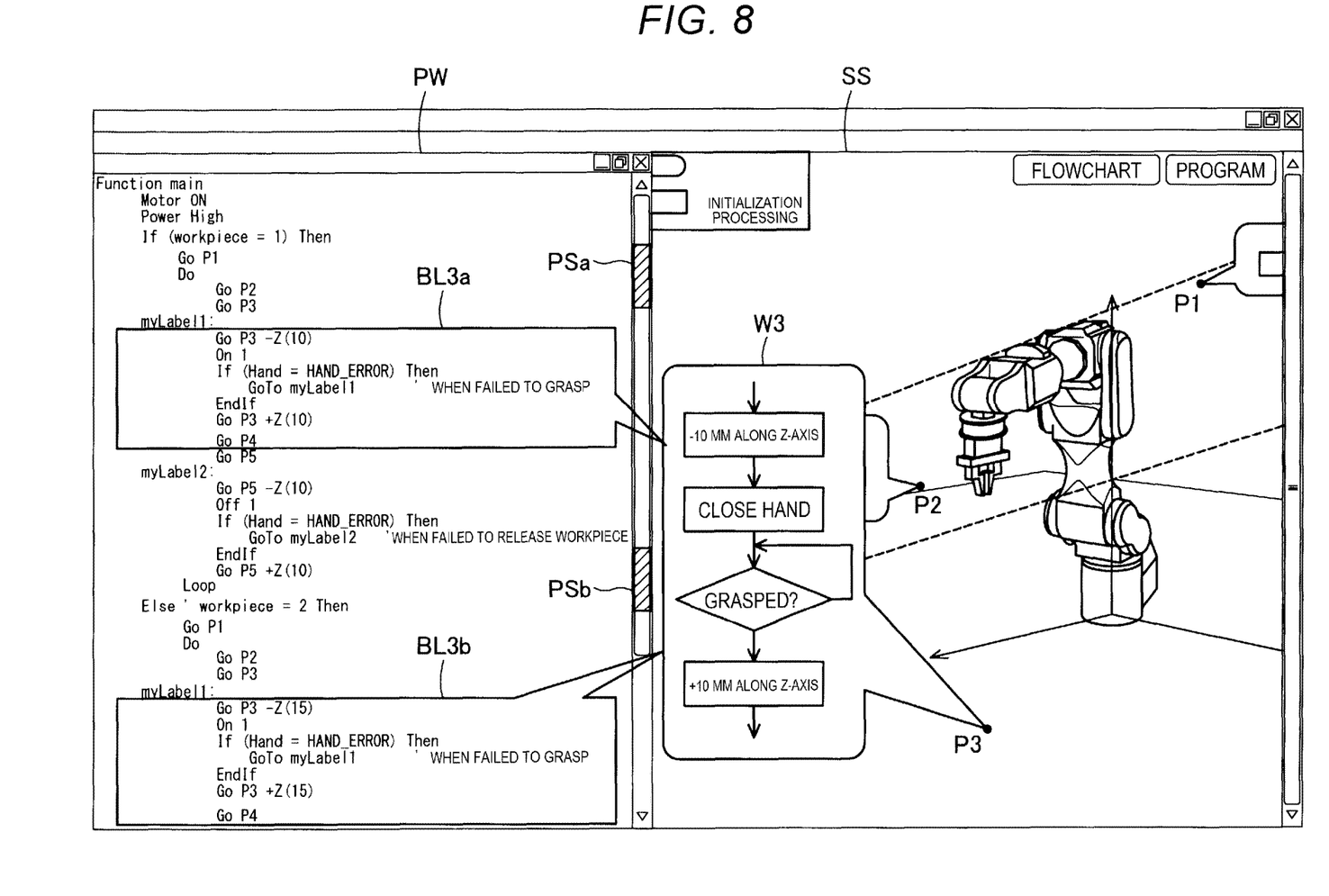
FIG. 8 is an explanatory view showing another display example when one window in FIG. 5 is selected.

FIG. 8 is an explanatory view showing another example of the content displayed when the window W3 is selected in FIG. 5. FIG. 8 is different from FIG. 7 in that the command operating near the teaching point P3, which is the display target of the window W3, is split into a plurality of sites in the work program 222. In such a case, the source code parts describing these commands are highlighted by a plurality of speech balloons PL3a, PL3b in the editing window PW. Also, positions PSa, PSb representing the source code parts of the commands near the teaching point P3 may be colored on a scroll bar in the editing window PW. This enables easy recognition of the source code parts of the commands operating near the teaching point P3, using the positions PSa, PSb on the scroll bar.

As described above, in the first embodiment, when the accepting unit 212 accepts the selection of the teaching point P3 displayed in the simulator screen SS, the window W3 including the command corresponding to the selected teaching point P3 is displayed in the simulator screen SS. Therefore, a command corresponding to an arbitrary teaching point, of a large number of teaching points, can be intuitively displayed. Also, when the accepting unit 212 accepts the selection of the window W3, the display form of the command in the window W3 in the editing window PW of the work program 222 is changed. Therefore, the site of the command in the window W3 in the work program 222 can be easily grasped.

B. Another Embodiment

Figure 9:
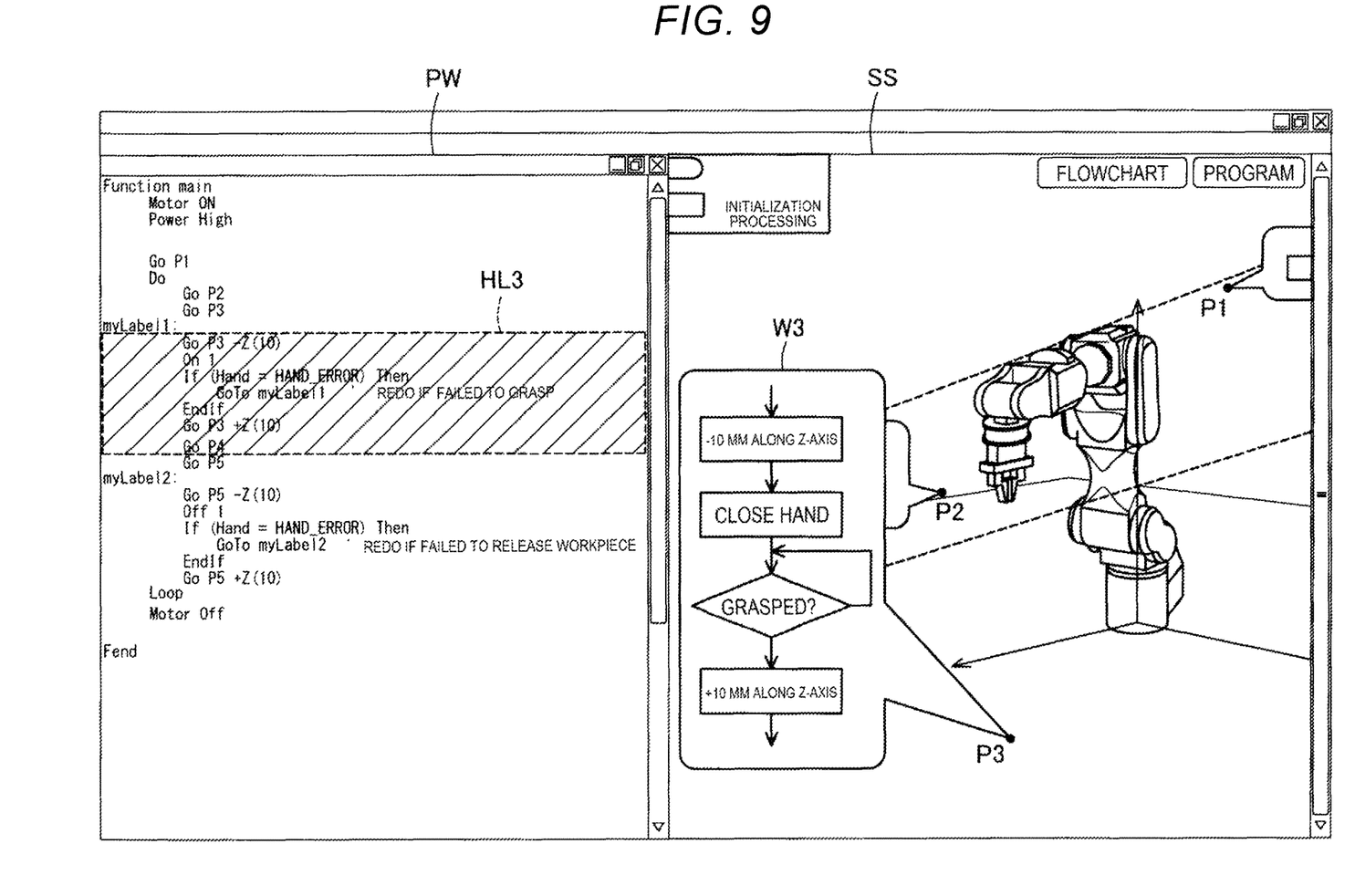
FIG. 9 is an explanatory view showing a display example when one window in FIG. 5 is selected in a second embodiment.

FIG. 9 is an explanatory view equivalent to FIG. 7 of the first embodiment and showing an example of the content displayed when the user selects the window W3 in FIG. 5, in another embodiment. In FIG. 7, described above, highlighting by the speech balloon PL3 is performed as the change in the display form in the editing window PW, of the command included in the window W3. Meanwhile, in the example in FIG. 9, highlighting by a highlighted area HL3 formed by blotting out a range of the command included in the window W3 with a specific color is performed as the change in the display form. An arbitrary color such as yellow or red may be able to be selected as the color of the highlighted area HL3.

Figure 10:
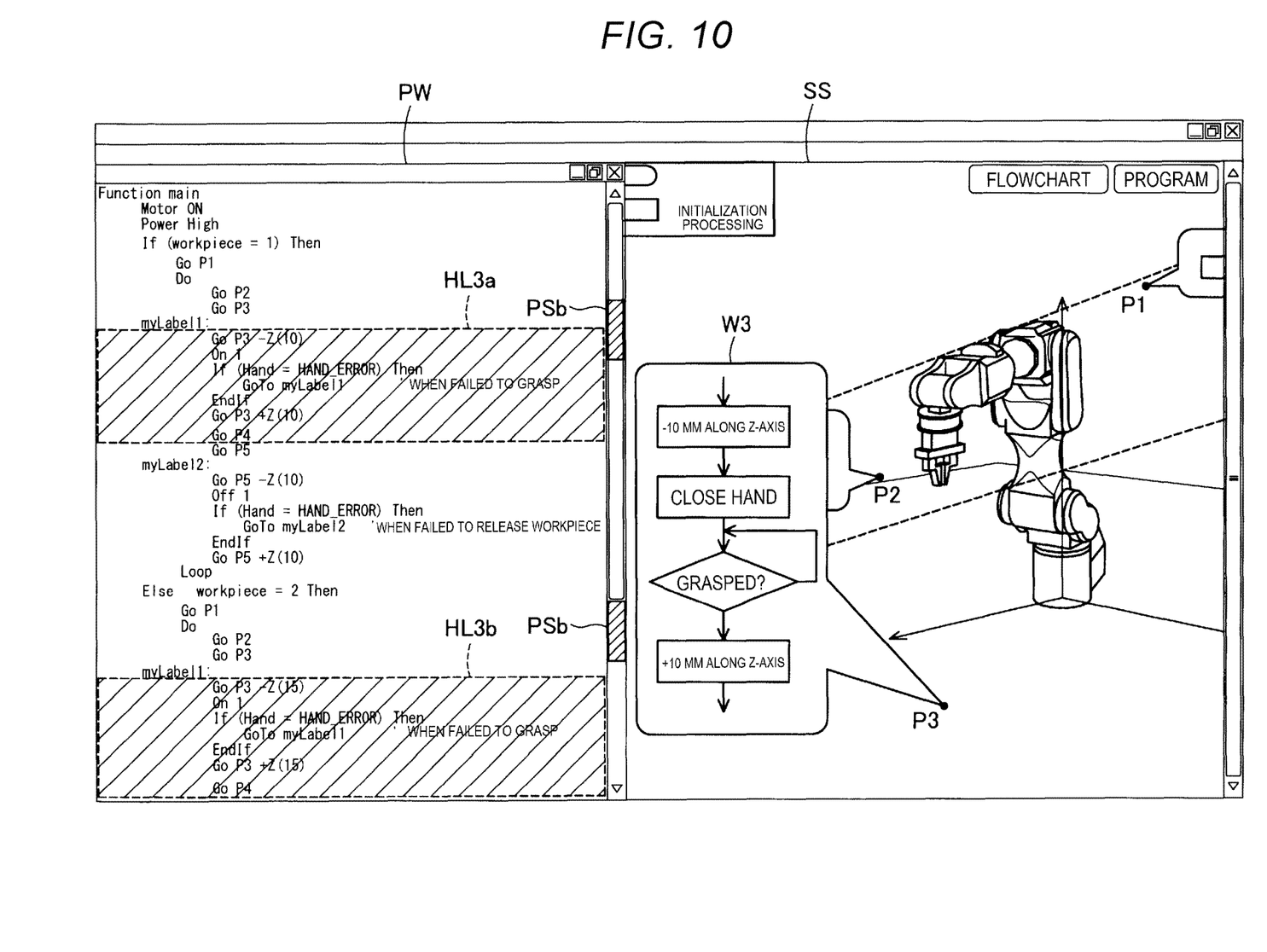
FIG. 10 is an explanatory view showing another display example when one window in FIG. 5 is selected in the second embodiment.

FIG. 10 shows a display example where the command near the teaching point P3, which is the display target of the window W3, is split into a plurality of sites in the work program 222. FIG. 10 is equivalent to FIG. 8 of the first embodiment. In this case, the source code parts describing these commands are highlighted as a plurality of highlighted areas HL3a, HL3b in the editing window PW. Also, as in FIG. 8, the positions PSa, PSb representing the source code parts of the commands near the teaching point P3 may be colored on the scroll bar in the editing window PW.

Figure 11:
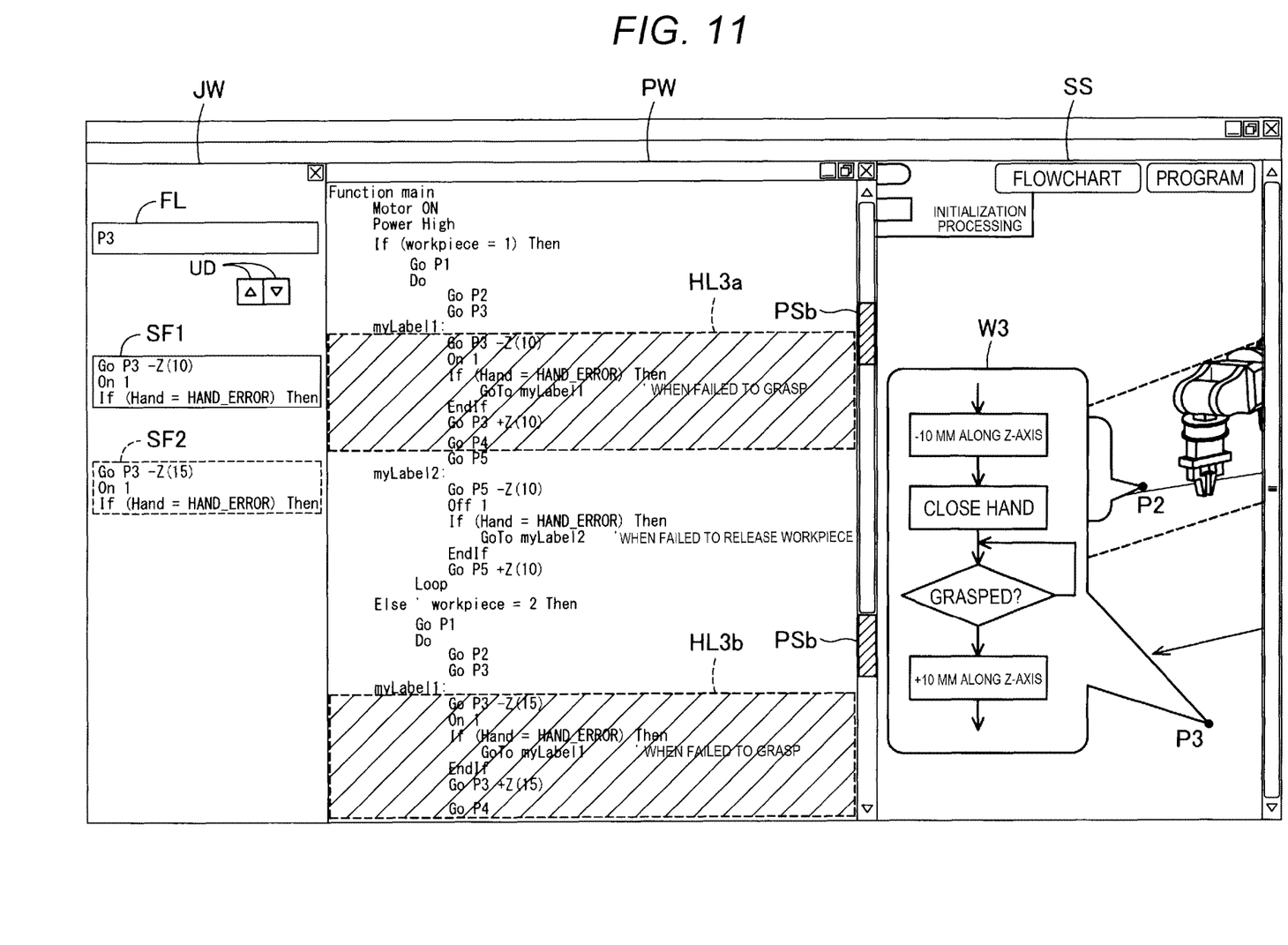
FIG. 11 is an explanatory view showing a modification example of FIG. 10.

FIG. 11 is a modification example of FIG. 10. Here, a jump window JW is provided in addition to the editing window PW. The jump window JW is also called a "second window". The jump window JW includes a teaching point field FL, an up/down button UD, and one or more target fields SF1, SF2. The teaching point field FL shows the teaching point P3 corresponding to the window W3 selected in FIG. 5. The target fields SF1, SF2 display a part of the command including the teaching point P3, in the work program 222. Preferably, the target fields SF1, SF2 are displayed in the same number as the number of teaching points P3 emerging in the work program 222. In the example in FIG. 11, the content of the first target field SF1, of the two target fields SF1, SF2, is the main display target in the editing window PW and is highlighted in contrast to the second target field SF2. The up/down button UD is a button used to sequentially select a target field to be the main display target, from among the plurality of target fields SF1, SF2. Displaying such a jump window JW on the screen enables the user to more quickly find the command included in the window W3, in the editing window PW.

The disclosure is not limited to the above embodiments and can be implemented according to various other aspects without departing from the spirit and scope of the disclosure. For example, the disclosure can be implemented according to the following aspects. A technical feature in the embodiments corresponding to a technical feature according to the respective aspects described below can be replaced or combined together according to need, in order to solve a part or all of the problems described in the disclosure or in order to achieve a part or all of the effects described in the disclosure. The technical feature can be deleted according to need, provided that the technical feature is not described as essential in the specification.

(1) According to a first aspect of the disclosure, a control device controlling a robot is provided. The control device includes: a storage unit storing a work program of the robot; a display control unit displaying a virtual robot formed by virtualizing the robot and a teaching point in a simulator screen at a display unit, based on the work program stored in the storage unit; and an accepting unit accepting a selection of the teaching point displayed in the simulator screen. The display control unit displays, in the simulator screen, a first window including a first command corresponding to the teaching point that is selected, when the accepting unit accepts the selection of the teaching point.

According to the control device, when the selection of a teaching point displayed in the simulator screen is accepted, the first window including the first command corresponding to the selected teaching point is displayed in the simulator screen. Therefore, a command corresponding to an arbitrary teaching point, of a plurality of teaching points, can be intuitively displayed.

(2) In the control device, the display control unit may change a display form of the first command in an editing window of the work program, when the accepting unit accepts a selection of the first window.

According to the control device, the display form of the first command in the editing window of the work program is changed when the selection of the first window is selected. Therefore, the site of the first command in the work program can be easily grasped.

(3) In the control device, the display form may be a color.

According to the control device, the color of the first command in the editing window of the work program is changed when the selection of the first window is accepted. Therefore, the site of the first command in the work program can be easily grasped.

(4) In the control device, a format of the first command included in the first window may be a flowchart.

According to the control device, an outline of the first command can be easily understood.

(5) In the control device, a form of the first command included in the first window may be a program language.

According to the control device, details of the first command can be easily seen.

(6) In the control device, a display format of the first command included in the first window may be switchable between a flowchart and a program language.

According to the control device, a display format that is easy to see can be employed, based on the user's preference.

(7) In the control device, the first window may include a second command which is at least one of a command before the first command and a command after the first command.

According to the control device, not only the first command but also the second command, which is a command before or after the first command, are displayed in the first window. Therefore, the operation content before or after the first command can be easily understood.

(8) According to a first aspect of the disclosure, a robot system including a robot and one of the foregoing control devices is provided.

According to the robot system, when the selection of a teaching point displayed in the simulator screen is accepted, the first window including the first command corresponding to the selected teaching point is displayed in the simulator screen. Therefore, a command corresponding to an arbitrary teaching point, of a plurality of teaching points, can be intuitively displayed.

The disclosure can also be implemented according to various other aspects. For example, the disclosure can be implemented as a robot system including a robot and a robot control device, a computer program for implementing the function of the robot control device, a non-transitory storage medium having the computer program recorded thereon, and the like.

What is claimed is:

1. A control device controlling a robot, the control device comprising:
    a memory configured to store a work program of the robot, the work program including information relating to a robot operation flow; and
    a processor configured to execute the work program so as to:
        display a virtual robot formed by virtualizing the robot and the plurality of teaching points in a simulator screen of a display according to the robot operation flow;
        accept a selection of a first teaching point of the plurality of teaching points; and
        display a plurality of balloons connecting to respective ones of the plurality of teaching points in the simulator screen, a first balloon of the plurality of balloons connecting to the first teaching point being displayed as an uppermost layer in the simulator screen to hide another balloon of the plurality of balloons when the first balloon overlaps the another balloon,
    wherein the first balloon includes either a flowchart or a program language corresponding to a first operation, and the first operation corresponds to movement of the robot within a predetermined range from the first teaching point according to the robot operation flow.

2. The control device according to claim 1, wherein
the first operation includes a plurality of commands including a first command,
the processor is further configured to display an editing screen adjacent to the simulator screen on the display when the processor accepts the selection of the first teaching point, and a source code of the work program corresponding to the first operation is displayed in the editing screen,
when the processor accepts a selection of the first command of the first operation displayed in the simulator screen, the processor is configured to change a display form of a first part of the source code in the editing screen, and
the first part of the source code corresponds to the first command of the first operation.

3. The control device according to claim 2, wherein
the display form is a color.

4. The control device according to claim 1, wherein
the processor is configured to switch a display content in the first balloon between the flowchart and the program language.

5. A robot system comprising:
a robot;
a memory configured to store a work program of the robot the work program including information relating to a robot operation flow; and
a processor configured to execute the work program so as to:
    display a virtual robot formed by virtualizing the robot and a plurality of teaching points in a simulator screen of a display according to the robot operation flow;
    accept a selection of a first teaching point of the plurality of teaching points; and
    display a plurality of balloons connecting to respective ones of the plurality of teaching points in the simulator screen, a first balloon of the plurality of balloons connecting to the first teaching point being displayed as an uppermost layer in the simulator screen to hide another balloon of the plurality of balloons when the first balloon overlaps the another balloon,
wherein the first balloon includes either a flowchart or a program language corresponding to a first operation, and the first operation corresponds to movement of the robot within a predetermined range from the first teaching point according to the robot operation flow.

6. The robot system according to claim 5, wherein the first operation includes a plurality of commands including a first command, the processor is further configured to display an editing screen adjacent to the simulator screen on the display when the processor accepts the selection of the first teaching point, and a source code of the work program corresponding to the first operation is displayed in the editing screen, when the processor accepts a selection of the first command of the first operation displayed in the simulator screen, the processor is configured to change a display form of a first part of the source code in the editing screen, and the first part of the source code corresponds to the first command of the first operation.

7. The robot system according to claim 6, wherein the display form is a color.

8. The robot system according to claim 5, wherein the processor is configured to switch a display content in the first balloon between the flowchart and the program language.

\* \* \* \* \*